US011810371B1

(12) United States Patent
Zhou et al.

(10) Patent No.: US 11,810,371 B1
(45) Date of Patent: Nov. 7, 2023

(54) MODEL-BASED LOCALIZATION ON HIGH-DEFINITION MAPS

(71) Applicant: PlusAI, Inc., Santa Clara, CA (US)

(72) Inventors: Mianwei Zhou, Sunnyvale, CA (US); Yibo Chen, San Jose, CA (US); Abhishek Bhatia, Savoy, IL (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 17/988,675

(22) Filed: Nov. 16, 2022

(51) Int. Cl.
*G06V 10/774* (2022.01)
*B60W 60/00* (2020.01)
*G06V 20/56* (2022.01)

(52) U.S. Cl.
CPC ......... *G06V 20/588* (2022.01); *B60W 60/001* (2020.02); *G06V 10/774* (2022.01); *B60W 2420/42* (2013.01); *B60W 2556/40* (2020.02)

(58) Field of Classification Search
None
See application file for complete search history.

(56) References Cited

U.S. PATENT DOCUMENTS

| 2020/0201344 | A1* | 6/2020 | Viswanathan | G06V 20/182 |
| 2020/0331465 | A1* | 10/2020 | Herman | G08G 1/161 |
| 2020/0410751 | A1* | 12/2020 | Omari | G06V 20/58 |

* cited by examiner

*Primary Examiner* — Idowu O Osifade
(74) *Attorney, Agent, or Firm* — Kilpatrick Townsend & Stockton LLP (57) ABSTRACT

Embodiments provide improved techniques for identifying object and vehicle locations on an HD map using camera images. Synthetic data may be generated by populating a high-definition (HD) map with an object. The populated HD map can be projected to a two-dimensional camera view image depicting the object. The HD map and object detection data generated from image (e.g., identifying lane/object locations within the image) can be used to train the model to identify HD map locations of an autonomous vehicle capturing images as it travels, as well as various objects detected from those captured images. Subsequently, a new image may be processed using object detection techniques to detect lane/object locations within the image. An HD map and the detected lane/object data may be provided to the model, which in turn identifies, on the HD map, the locations of the vehicle and the various objects.

20 Claims, 9 Drawing Sheets

MODEL-BASED LOCALIZATION ON HIGH-DEFINITION MAPS

BACKGROUND

Various vehicles employ computing means to aid automated vehicle operation. Recently, in the automotive industry, much of the focus is on making a vehicle operate in an autonomous mode in a safe manner. Some automated vehicles operate using high-definition maps (hereinafter referred to as "HD maps," for brevity) that have extremely high precision (e.g., that are accurate to a centimeter).

Many autonomous vehicle systems employ predictive models (e.g., neural networks) that, given various sensor input captured at the vehicle, predict a future driving situation (e.g., a lane change, a cut in, etc.). In response to the predicted situation, a corresponding action (e.g., reduce speed, change lanes, etc.) may be selected for the autonomous vehicle in question (e.g., the ego vehicle) and actuators of the ego vehicle may be utilized to carry out the action. Making these predictions requires knowledge of the location of the ego vehicle, as well as the locations of other nearby objects (e.g., other vehicles, stop signs, obstacles, etc.). Conventionally, identifying these locations require computationally expensive comparisons between at least portions of an image of the surrounding area and attributes of the HD map. The results of these comparisons were sensitive to camera calibration, especially at the far end of the road.

Embodiments are directed to addressing these and other problems, individually and collectively.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Embodiments provide techniques for using a machine-learning model to identify, on a high-definition (HD) map, locations corresponding to an ego vehicle and various objects that are depicted in an image (e.g., an image presumed to have been captured by a camera of the ego vehicle). The model may be trained to take as input an HD map and lane and/or object detection data identifying where driving lanes and/or objects are located within an image and provide output identifying locations, on the HD map, for the objects depicted in the image and the camera location of the camera that captured the image. As used herein, the term "object detection data" is intended to include any suitable data identifying a location of a driving lane boundary or any other suitable object identified from an image. The term "object" is intended to refer to a lane boundary or any suitable physical object depicted in an image (e.g., a car, a truck, a stop sign, a speed limit sign, etc.). The model may be trained using any suitable machine-learning algorithm (e.g., unsupervised learning algorithms, etc.) with a training data set that includes a variety of examples. In some embodiments, these examples may be generated as part of a synthetic data set. Each example may include an HD map and object detection data (e.g., data identifying lanes, objects, obstacles, and the like and their corresponding locations within an image). During training, the model may learn how to predict ego vehicle and object locations on the HD map provided as input from the object detection data. Or in other words, how to predict ego vehicle/object location on an HD map from an image of the objects in camera view. At runtime, a camera of the ego vehicle may capture an image and the image may be processed using object detection techniques to generate object detection data indicating the objects and their corresponding locations within the image. The object detection data and an HD map may be provided as input to the model, which may identify the locations of the ego vehicle and nearby objects (e.g., the objects detected from the image) on the HD map.

In one general aspect, a method may include obtaining, by a processor of a vehicle, a machine-learning model that is trained to identify object locations within a high definition (HD) map. In some embodiments, the machine-learning model may be previously trained based at least in part on a machine learning algorithm and a training data set comprising 1) HD map data corresponding to a respective HD map and identifying locations for one or more objects on the respective HD map and 2) object detection data corresponding to an image depicting the one or more objects. The method may include obtaining, by the processor from a camera of the vehicle, an image of an area in which the vehicle is located. The method may include generating, by the processor from the image, corresponding object detection data identifying object locations for one or more objects depicted within the image. The method may include obtaining, by the processor, corresponding HD map data of the area. The method may include providing, by the processor to the machine-learning model as input, the corresponding HD map data of the area and the corresponding object detection data generated from the image. The method may include receiving, by the processor, output generated by the machine-learning model. In some embodiments, the output may indicate, on the HD map, respective locations of 1) the vehicle and 2) the one or more objects. The method may include executing, by the processor, one or more operations based at least in part on output.

In one general aspect, a computing device may include one or more processors and a memory storing instructions that, when executed by the one or more processors, cause the one or more processors to perform the actions of the methods described herein.

In one general aspect, a non-transitory computer-readable medium storing instructions that, when executed by one or more processors of a computing device, cause the computing device to perform the actions of the methods described herein.

Other embodiments of this aspect include corresponding computer systems, apparatus, and computer programs recorded on one or more computer storage devices, each configured to perform the actions of the methods described herein.

Further details regarding embodiments of can be found in the Detailed Description and the Figures.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide techniques for identifying the location of an ego vehicle (e.g., autonomous car) and surrounding objects (e.g., other cars, lane boundaries, stop signs, and the like) using a machine-learning model ("the model," for brevity). The model may be previously trained to identify these locations based on a high-definition map and object detection data generated from an image depicting the objects (e.g., an image captured by a camera of the ego vehicle).

In some embodiments, a synthetic data set may be generated and utilized to train the model. By way of example, an HD map (e.g., depicting a bird's eye view of an area) may be obtained and a number of objects may be populated on the HD map at various locations (e.g., random locations). A map elevation, the ego vehicle's/camera's location, and view angle can be set, and the populated HD map may be used to generate (e.g., project to) an image in camera view (also referred to as "a camera view image"). The objects from the HD map may be depicted in the camera view image. Object data from the camera view image identifying lane boundaries (e.g., solid lane lines, broken lane lines) and the objects and their corresponding locations within the image may be obtained. In some embodiments, the object data may be previously known from the placement of the objects and ego vehicle on the HD map. As another example, the camera view image can be processed with any suitable object detection algorithm to generate the object data indicating the various objects (e.g., lane boundaries, obstacles, etc.) and their corresponding locations. The unpopulated HD map and the object data can be provided as training data to learn the association between the objects depicted in the camera view image to the locations on the HD map (e.g., in the bird's eye view) as well as the ego vehicle's location on the HD map. At any suitable time, the populated HD map may be used as ground truth to determine the accuracy of the model's output.

Once trained, the model can be deployed to a vehicle and used for localization operations. For example, a vehicle (e.g., an autonomous vehicle, a semi-autonomous vehicle, etc.) can be equipped with a camera which can capture images over time. These images can be processed with any suitable object detection techniques to generate object data that identifies various objects (e.g., lane boundaries, stop signs, other cars, etc.) depicted within the image. An HD map corresponding to the area may be obtained from memory. The HD map and the object data generated from that image may be provided to the previously trained model as input. The model may output Prior to discussing embodiments, some terms can be described in further detail.

As used herein, "localization," refers to operations related to identifying a location for an autonomous vehicle (e.g., the ego vehicle) and/or one or more nearby objects.

A "high-definition map," or "HD map," refers to high precision digital map data that provides high accuracy information utilized for autonomous driving navigation. An HD map (also referred to as "HD map data") may include multiple layers such as a base map layer (e.g., a standard definition map), a geometric map (including raw sensor data collected from LIDAR, various cameras, GPS, IMUS, and the like), a semantic map (e.g., 2D or 3D object data indication lane boundaries (and type of lane boundary such as "solid" or "broken"), intersections, stop signs, traffic lights, speed signs, and the like), a map priors layer (e.g., including average wait times at traffic lights and the like), and real-time knowledge.

"Object detection," as used herein refers to a collection of tasks including object classification (e.g., classifying/identifying the object as a ball, a car, a child, etc.) and object localization (e.g., identifying the location of an object using a bounding box) of objects depicted within an image or video.

A "computing device" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

Details of some embodiments will now be described in greater detail.

Figure 1:
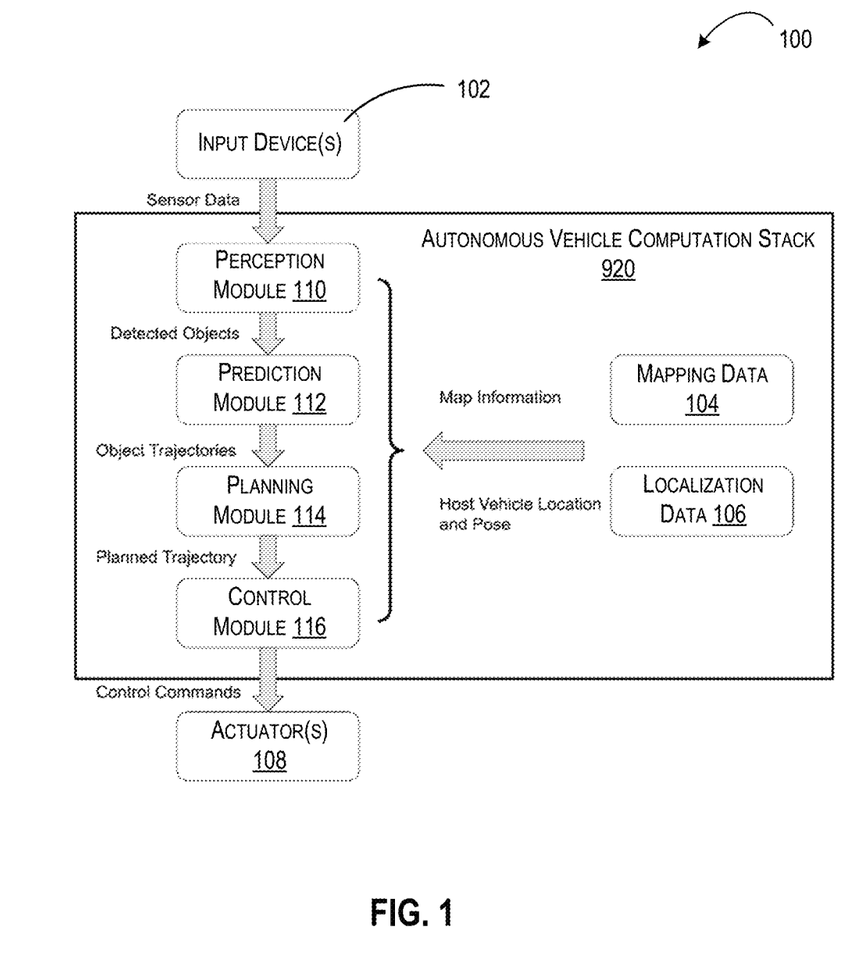
FIG. 1 illustrates a block diagram of an autonomous vehicle computation stack of an exemplary vehicle, according to various embodiments.

FIG. 1 provides another block diagram of an exemplary vehicle computer (e.g., vehicle computer 100), according to various embodiments. The vehicle computer 100 may be an example of the vehicle computer 950 of FIG. 9. Vehicle computer 100 may include a main computation stack 120 (e.g., a vehicle computer) including one or more processors (e.g., processor(s) 954 of FIG. 9). The main computation stack 120 may comprise one or more modules, including but not limited to, a perception module 110, a prediction module 112, a planning/planner module 114, and a control module 116. The instructions corresponding to these modules may be stored in memory (e.g., system memory 952 of FIG. 9).

Figure 9:
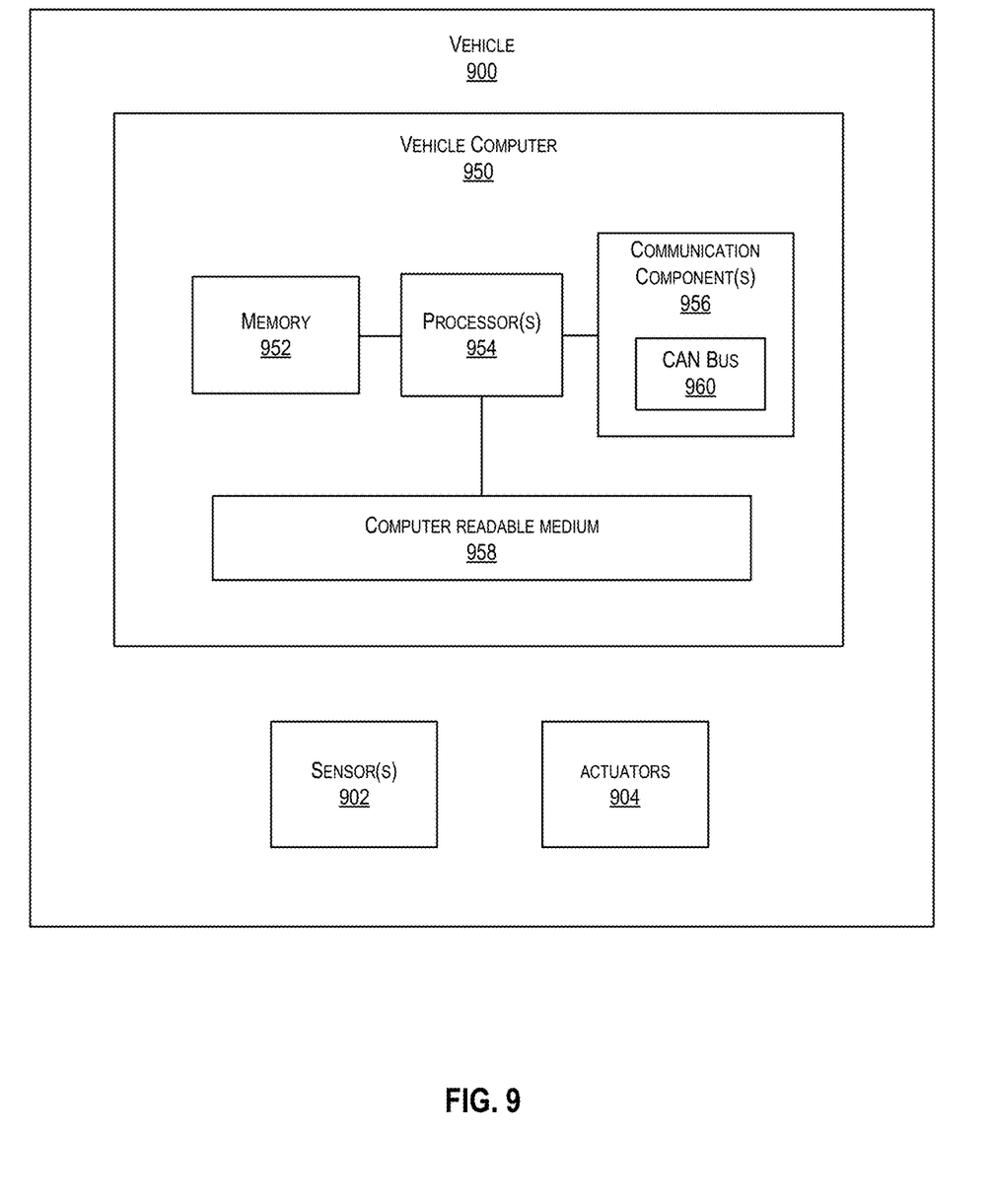
FIG. 9 illustrates components of an exemplary vehicle computer for an autonomous vehicle, according to various embodiments.

The main computation stack 120 may receive inputs (e.g., sensor data) from one or more input device(s) 102 (each an example of the sensor(s) 902 of FIG. 9). According to various embodiments, the input device(s) 102 may include one or more of a radar sensor, a light detection and ranging (lidar) sensor, a camera, computer vision, a Global Positioning System (GPS) sensor, etc. The sensor data may be provided to the perception module 110 that may identify one or more objects in the input data. The input data and the identified objects may then be provided to the prediction module 112 that may predict trajectories of the identified objects, so that the planner module 114 may determine one or more trajectories for the vehicle that would avoid the stationary or moving objects based on the input data from the prediction module 112. The one or more trajectories planned by the panning module 114 may be provided to the control module 116, which would then control one or more actuators 108 of the vehicle to have the vehicle advance in accordance with at least one of the one or more trajectories.

The perception module 110, prediction module 112, planning module 114, or any suitable combination thereof, may be configured to utilize one or more machine learning models (e.g., neural networks, etc.) trained in the manner described above in connection with FIGS. 1-6. By way of example, the perception module 110 may identify objects from input data utilizing an object detection model (e.g., a convolutional neural network (CNN), a region-based CNN (R-CNN), etc.) trained to identify objects from one or more images and/or videos using supervised and/or unsupervised learning algorithms and a training data set. If supervised learning algorithms are utilized, the training data set may be labeled with classifications or other labels corresponding to objects previously identified in a training data input instance (e.g., within an image and/or from other sensor data). Using this labeled data, the model may be trained to map known inputs to outputs to configure the model to identify objects from images (or videos) provided as subsequent input.

According to various embodiments, any suitable combination of the perception module 110, the prediction module 112, the planning module 114 and/or the control module 116 may also receive mapping data 104 and/or localization data 106 for improved trajectory generation. The modules may calculate their respective outputs based on the mapping data 104 and/or localization data 106, in addition to the inputs received from the input device(s) 102. In some embodiments, the localization data 106 may include a host vehicle's location, pose, and locations of various nearby objects. In some embodiments, the localization data 106 may be generated by the perception module 110 using the techniques described herein. Mapping data 104 may include one or more high-definition (HD) maps corresponding to one or more geographical areas. In some embodiments, the localization data 106 may be generated based at least in part on sensor data (e.g., an image) obtained by the input device(s) 102 and the mapping data 104, or more specifically, the HD map(s) included in the mapping data 104.

Figure 2:
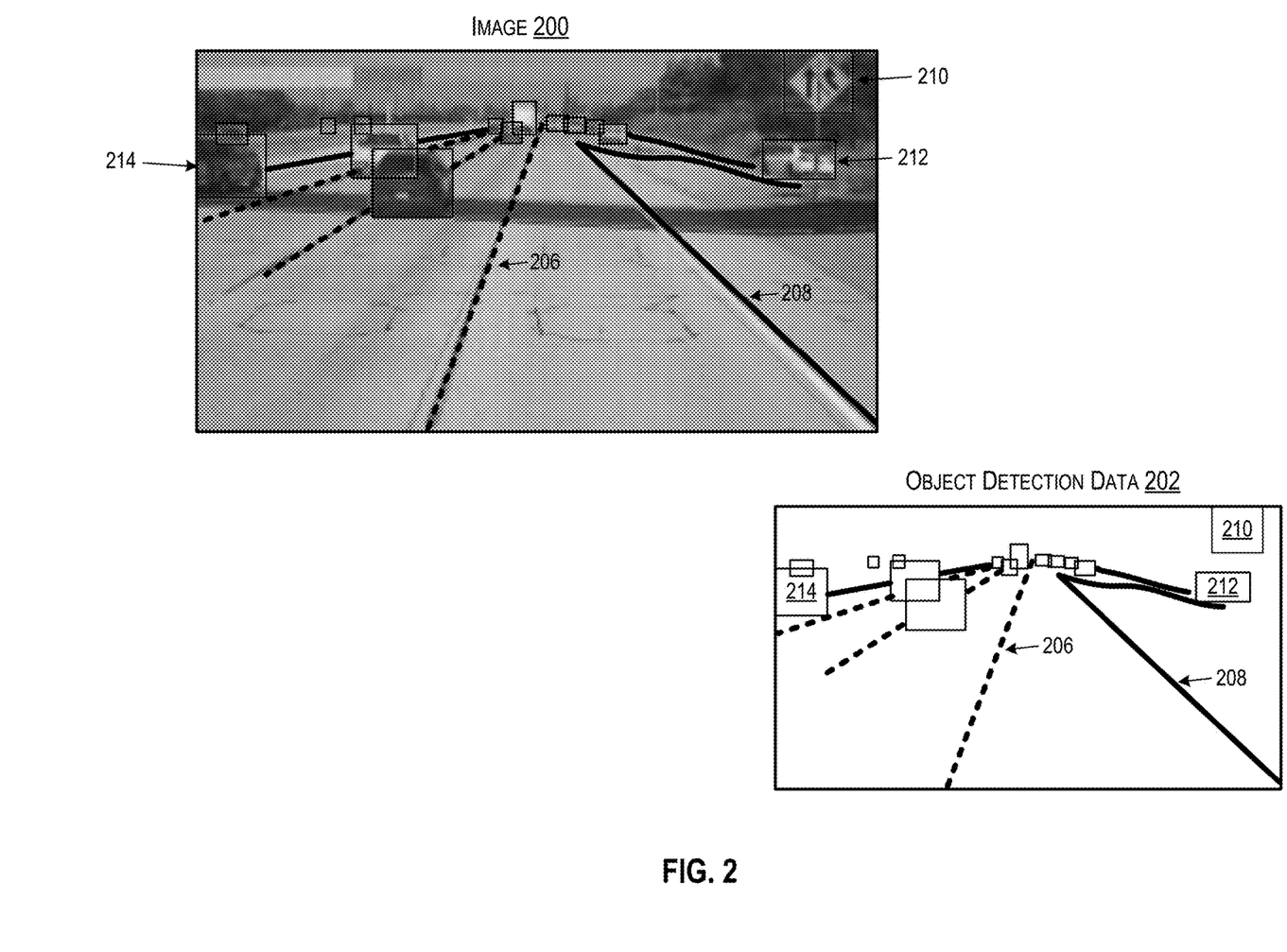
FIG. 2 illustrates an example image and corresponding object detection data, in accordance with at least one embodiment.

FIG. 2 illustrates an example image 200 and corresponding object detection data 202, in accordance with at least one embodiment. In at least one embodiment, an object detection technique can be utilized to generate object detection data 202 from image 200. By way of example, some conventional techniques for object detection utilize a region-based convolutional neural network (R-CNNs). An R-CNN includes a convolutional neural network (CNN) structure which encodes the image information in a generic manner to generate image feature embeddings. Next, the encoded information may be transformed to a list of class-agnostic candidate objects (e.g., region proposals) using a region proposal network (RPN) (e.g., a neural network previously trained to generate region proposals from an image). The objects from the region proposals are pooled to region-of interest (ROI) features. That is the region proposal objects are combined with the image feature representations generated by the encoding CNN to generate ROI features. These ROI features may be fed to a second neural network that includes a classifier and a regressor head. A refined list of objects defined by class labels and bounding box coordinates is obtained from the classifier and the regressor head, respectively. A R-CNN is used for illustrative purposes only and is not intended to limit the scope of this disclosure. It should be appreciated that other object detection techniques may be employed to generate object detection data 202.

As seen in FIG. 2, object detection data 202 may identify locations of any suitable objects depicted within image 200. As a non-limiting example, object detection data 202 may indicate the locations of objects 206-214. Any suitable number of objects may be depicted in, and thereafter identified from, the image 200. In some embodiments, the type of object may be identified in addition to its location within the image. By way of example, the object detection techniques utilized may identify the object 206 is a broken lane boundary while object 208 is a solid line boundary. Similarly, the object detection techniques employed may identify that objects 212 and 214 are vehicles and object 210 is a traffic sign (or more specifically a merge sign, indicating a warning that two separate roadways will converge into one lane ahead). The locations of the objects detected may be specified in any suitable manner. By way of example, in some embodiments, an object's location within the image may be identified using a bounding box. The location may be considered the bounding box itself, or the location of the object can be considered to be a point within the bounding box (e.g., a corner point of the bounding box, a center point of the bounding box, etc.). In some embodiments, a number of pixel locations identified by any suitable manner (e.g., by x-y coordinates) may be associated with a given object (e.g., object 206 corresponding to the broken lane) to identify the location (or area) occupied by the object within the image.

Figure 3:
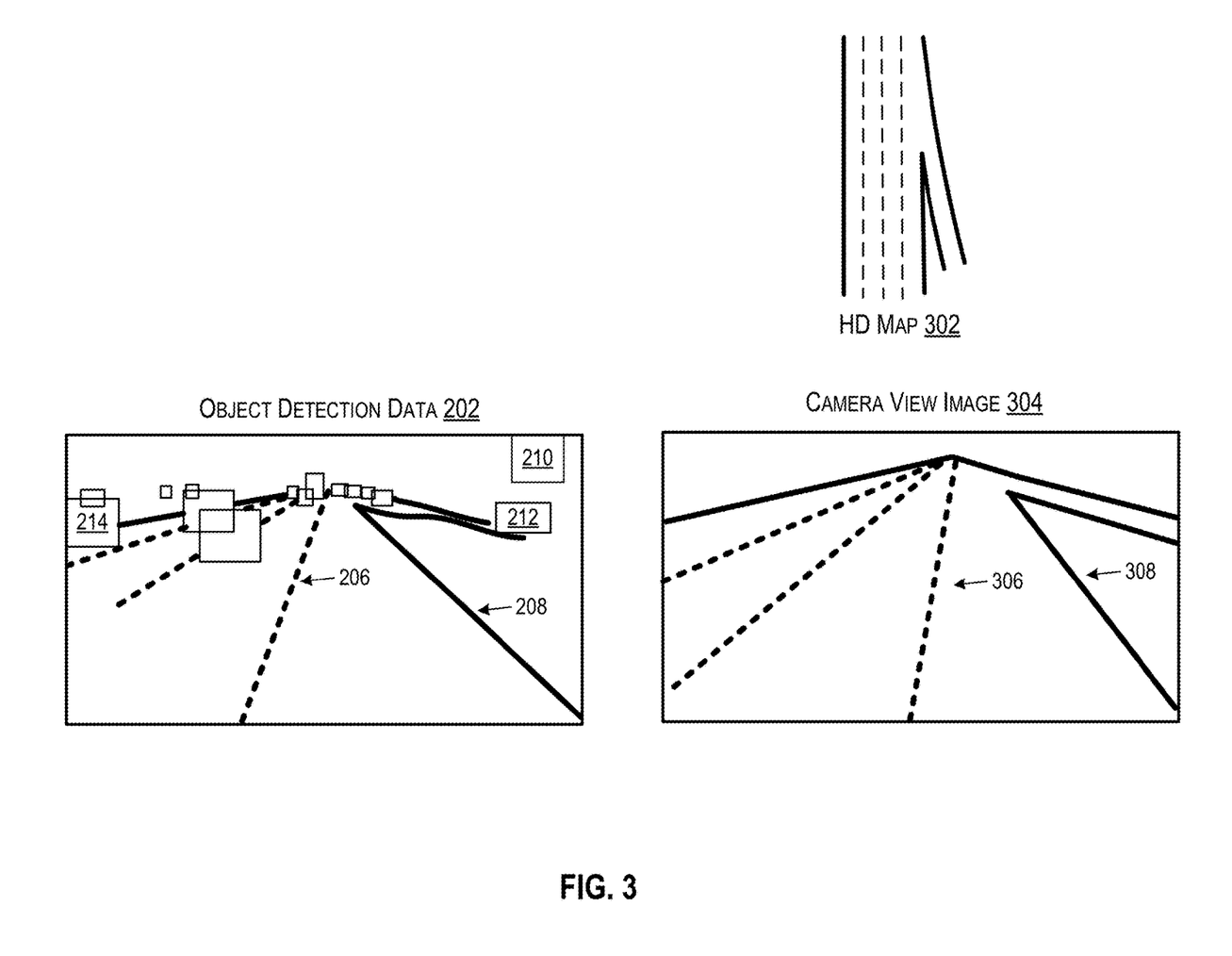
FIG. 3 is a block diagram 300 illustrating a conventional localization technique for identifying ego vehicle and object location.

FIG. 3 is a block diagram 300 illustrating a conventional localization technique for identifying ego vehicle and object location. In some systems, an HD map (e.g., HD map 302) may be projected to a camera view as depicted at 304, and the lanes of the projected image may be matched to the lanes identified in object detection data 202. By way of example, the lanes of camera view image 304 may be overlaid over object detection data 202 and compared pixel by pixel to identify overlap. If a match is identified (e.g., by determining that over a threshold number of pixels match, then the objects of the object detection data 202 and the location of the ego vehicle (corresponding to the camera that captured the object detection data 202) may be placed within the camera view image 304 and the now populated camera view image 304 can be converted back to a now populated HD map.

The comparisons required for this matching procedure can be computationally extensive and can lead to delay in identifying the locations of the object on the HD map. In the context of autonomous driving, this delay can be hazardous as object detection may occur too late to avoid a collision or other negative consequence.

Figure 4:
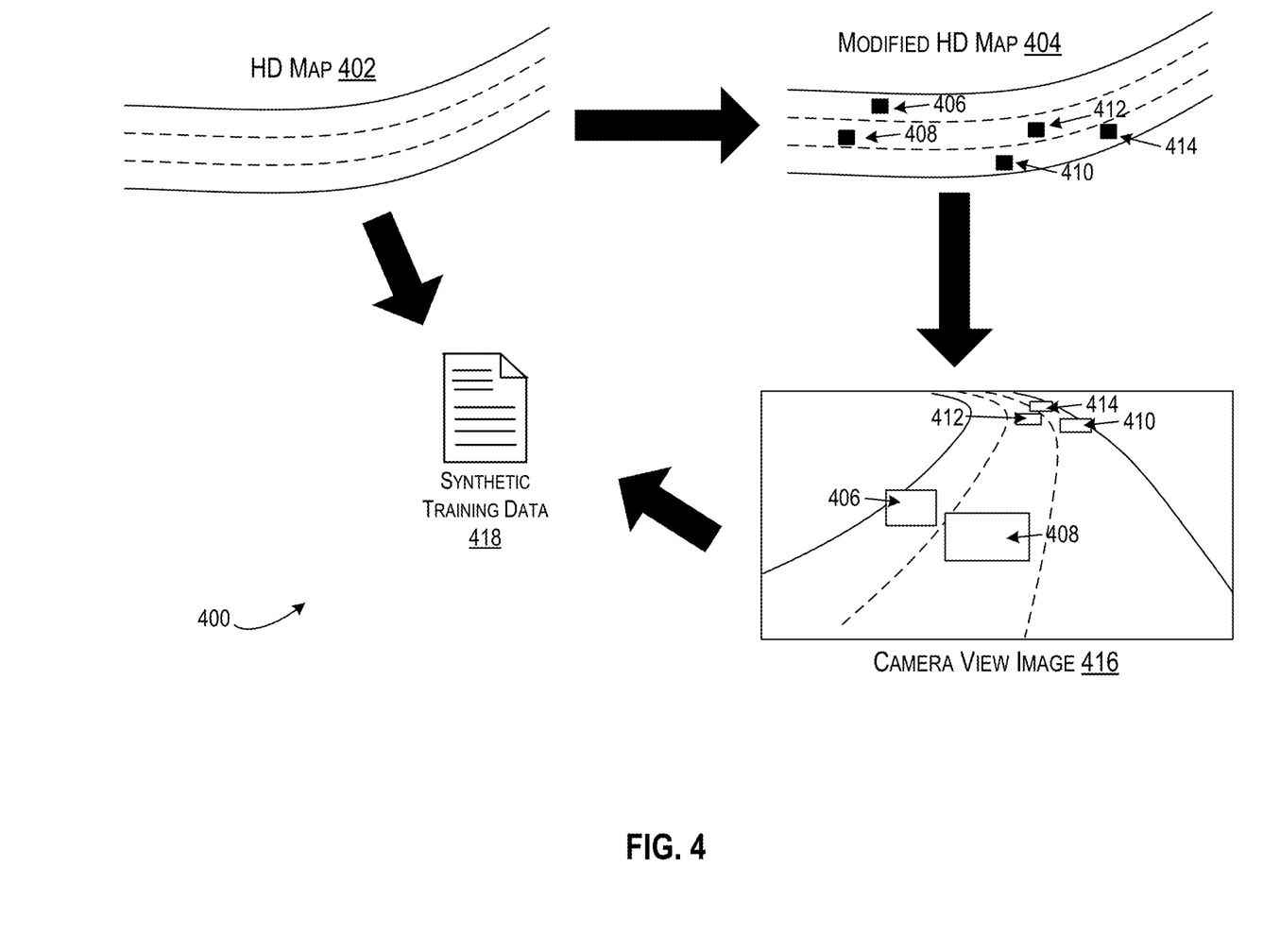
FIG. 4 illustrates an example method for generating synthetic training data, in accordance with at least one embodiment.

FIG. 4 illustrates an example method 400 for generating synthetic training data (e.g., synthetic training data 408), in accordance with at least one embodiment. Method 400 may include obtaining an HD map (e.g., HD map 402 depicting a bird's eye view of an area). Once obtained, the HD map 402 may be used to generate modified HD map 404. By way of example, a number of objects may be populated on the HD map 402 at various locations (e.g., random locations) to generate modified HD map 404. As depicted modified HD map 404 may include objects 406, 408, 410, 412, and 414.

In some embodiments, map elevation, the ego vehicle's/camera's location, and a view angle can be set and the modified HD map 404 may be used to generate (e.g., project to) an image in camera view (e.g., camera view image 416). The objects 406-414 from the modified HD map 404 may be depicted in the camera view image 416 as seen in FIG. 4. Object data from the camera view image identifying lane boundaries (e.g., solid lane lines, broken lane lines) and the objects and their corresponding locations within the image may be obtained. In some embodiments, the object data may be previously known from the placement of the objects and ego vehicle on the modified HD map 404. As another example, the camera view image 416 can be processed with any suitable object detection algorithm (e.g., the object detection algorithm discussed in connection with FIG. 2) to generate object data (e.g., object detection data) indicating the various objects (e.g., lane boundaries, obstacles, etc. corresponding to objects 406-414) and their corresponding locations. The HD map 402 and the object data generated from camera view image 416 can be provided as a training data example of synthetic training data 408. The operations of method 400 may be performed any suitable number of times to generate any suitable number of examples for synthetic training data 408. In some embodiments, the corresponding modified HD map (e.g., modified HD map 404) may be saved as part of an example and subsequently utilized as ground truth data.

In some embodiments, a number of camera view images may be generated from the modified HD map 404 (and/or multiple modified HD maps having a variety of objects placed on them) using the same or different map elevations, ego vehicle locations, and/or view angles. By utilizing different map elevations, ego vehicle locations, and/or view angles, the synthetic training data 408 may include examples which enable a model later trained on that data (e.g., model 502 of FIG. 5) to be more robust and less sensitive to varying camera angles and the like.

Figure 5:
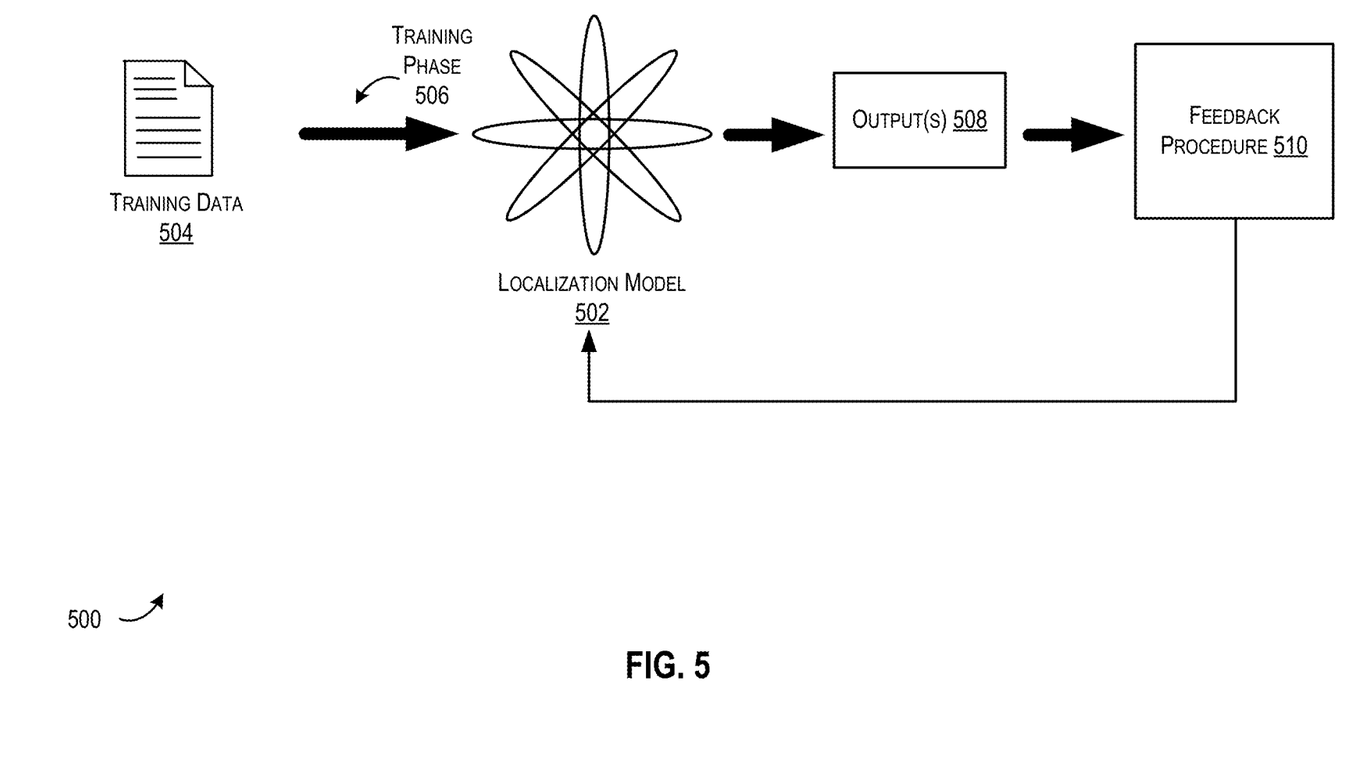
FIG. 5 illustrates an example method for training a machine-learning model with the synthetic training data of FIG. 4, in accordance with at least one embodiment.

FIG. 5 illustrates an example method 500 for training a machine-learning model (e.g., localization model 502) with the synthetic training data of FIG. 4, in accordance with at least one embodiment. The method 500 may be performed as an offline process by a computing system separate and distinct from the vehicle computer 100 of FIG. 1 (an example of the vehicle computer 950 of FIG. 9). Training data 504 may include the synthetic training data 418 generated in the manner discussed in connection with FIG. 4.

A training phase may be executed at 506 to train the localization model 502 identify object locations, on an HD map provided as input, from an image of the objects, also provided as input. Training the localization model 502 may utilize training data 504 and any suitable combination of one or more machine-learning algorithms. Each entry of training data 504 may include any suitable number of examples generated in the manner discussed in connection with FIG. 4. Each example can include an empty HD map and object data generated from an image depicting one or more objects. The object data may, for example, identify locations of the one or more objects as detected from the image. In some embodiments, the examples of training data 504 may include a corresponding populated HD map (e.g., HD map 404 of FIG. 4) used to generate the image (e.g., the camera view image 416 of FIG. 4) that depicts the one or more objects. The machine-learning algorithm used to train localization model 502 may utilize any suitable combination of supervised learning, unsupervised learning, and/or semi-supervised learning (e.g., a mix of supervised and unsupervised learning).

In some embodiments, unsupervised machine-learning algorithms may be utilized to train localization model 502. Unsupervised machine-learning algorithms are configured to learn patterns from untagged data. In some embodiments, the training phase 506 may utilize unsupervised machine-learning algorithms to generate localization model 502. For example, the training data 504 may include unlabeled data. Training data 504 may be utilized, together with an unsupervised learning algorithm to learn associations or relationships between variables in a given data set. In this context, associations or relationships may be learned between the object locations within the object data (identifying ego vehicle location and locations of the objects in the image from which the object data was generated) and locations on the HD map. Using the unsupervised learning algorithm and training data 504, the localization model 502 may generate output(s) 508 (e.g., an HD map populated with the location of the ego vehicle and with objects in accordance with where those objects were depicted in a corresponding image, location data identifying locations of the ego vehicle and objects within the HD map, etc.).

As another example, in supervised learning, training data used to train a model may be labeled or otherwise annotated to indicate input/output pairs. That is, a positive example of an approved input/output pair that has been deemed to be an acceptable pairing and/or a negative example of an input/output pairing that has been deemed to be in error. Some portion of training data 504 may include labeled data. This labeled data may include examples of HD map and object data inputs and a populated HD map output indicating the locations of the corresponding objects. In some embodiments, the pairing itself may be considered a positive example (e.g., an acceptable input/output pairing) or the example may be labeled as a positive example. In some embodiments, negative examples may be included in the training data 504. For example, an HD map and object data input may be paired with a populated HD map that include incorrect locations of the corresponding objects and the example may be labeled as a negative example. Using the described training data and a supervised machine-learning algorithm, an inferred function may be generated that maps the example inputs (e.g., HD map 402 and object data generated from camera view image 416) to the corresponding outputs (e.g., populated HD map 404) of the training data 504. The localization model 502 may be an example of one such function.

Any suitable portion of the training data 504 may be utilized during the training phase 506 to train the localization model 502. For example, 80% of the training data 504 may be utilized to train the localization model 502. Once trained, or at any suitable time, the localization model 502 may be evaluated to assess the quality (e.g., accuracy) of the model. By way of example, a portion (e.g., 20%) of the examples of training data 504 may be utilized as input to the localization model 502 to generate output(s) 212 (e.g., any suitable number of outputs corresponding to the number of inputs utilized from training data 504). Each of the output(s) 212 (e.g., HD maps populated with various objects and ego vehicle locations) may be compared to the corresponding populated HD map associated with each training data example. If the output matches (e.g., each of the object locations of the output are within a threshold distance of the actual locations corresponding to the populated HD map from the training data example), the corresponding output may be deemed accurate. Any suitable number of examples may be utilized, and a number of outputs may be compared to the known object/ego vehicle locations of populated HD maps (e.g., HD map 404 of FIG. 4) associated with the training data examples to quantify a degree of accuracy for the localization model 502. For example, if 90 out of 100 of the input examples generate locations on the HD map that match the locations for the objects/ego vehicle in the populated HD map, the localization model 502 may be determined to be 90% accurate.

In some embodiments, as the localization model 502 is utilized for subsequent inputs (e.g., an empty HD map and object data identifying object locations of a number of object depicted within an image), the subsequent output generated by the localization model 502 (e.g., an HD map or HD map data indicating object locations identified from the image depicting the objects) may be added to corresponding input and used to retrain and/or update the localization model 502. In some embodiments, the example may not be used to retrain or update the model until feedback procedure 510 is execute. In feedback procedure 510, the example and the corresponding output generated for the example by localization model 502 is presented to a user and the user identifies whether the output (e.g., the HD map or HD map data indicating the locations of objects that were placed on the HD map according to their locations as depicted within an image) is correct for the given example.

In some embodiments, feedback procedure 520 may include collecting various metrics associated with the one or more operations executed based on the output generated by the machine-learning model. By way of example, various metrics regarding operations performed by with actuators of the vehicle such as lane changes, modifications to course or speed, or the like may be collected. These metrics may be evaluated based at least in part on a predefined rule set that defines acceptable driving situations and/or acceptable ranges or values corresponding to operations performed by the vehicle while operating autonomously. If the metrics indicate operations that fall outside the ranges or values identified by the ruleset as being acceptable, the output provided by the model in that situation may be deemed inaccurate. Conversely, if the metrics indicate that the operations performed in response to the output provided by the model fall within the parameters specified by the rule set as being indicative of acceptable driving situations, then the output may be deemed accurate and the related information (e.g., the HD map, lane/object detection data, and corresponding object location determinations on the HD map) may be added to the training data and used to refine and/or update the model. This process may be performed any suitable number of times such that the model is refined and/or updated over time to provide increasingly accurate location determinations.

The process 500 may be performed any suitable number of times at any suitable interval and/or according to any suitable schedule such that the accuracy of localization model 502 is improved over time.

Figure 6:
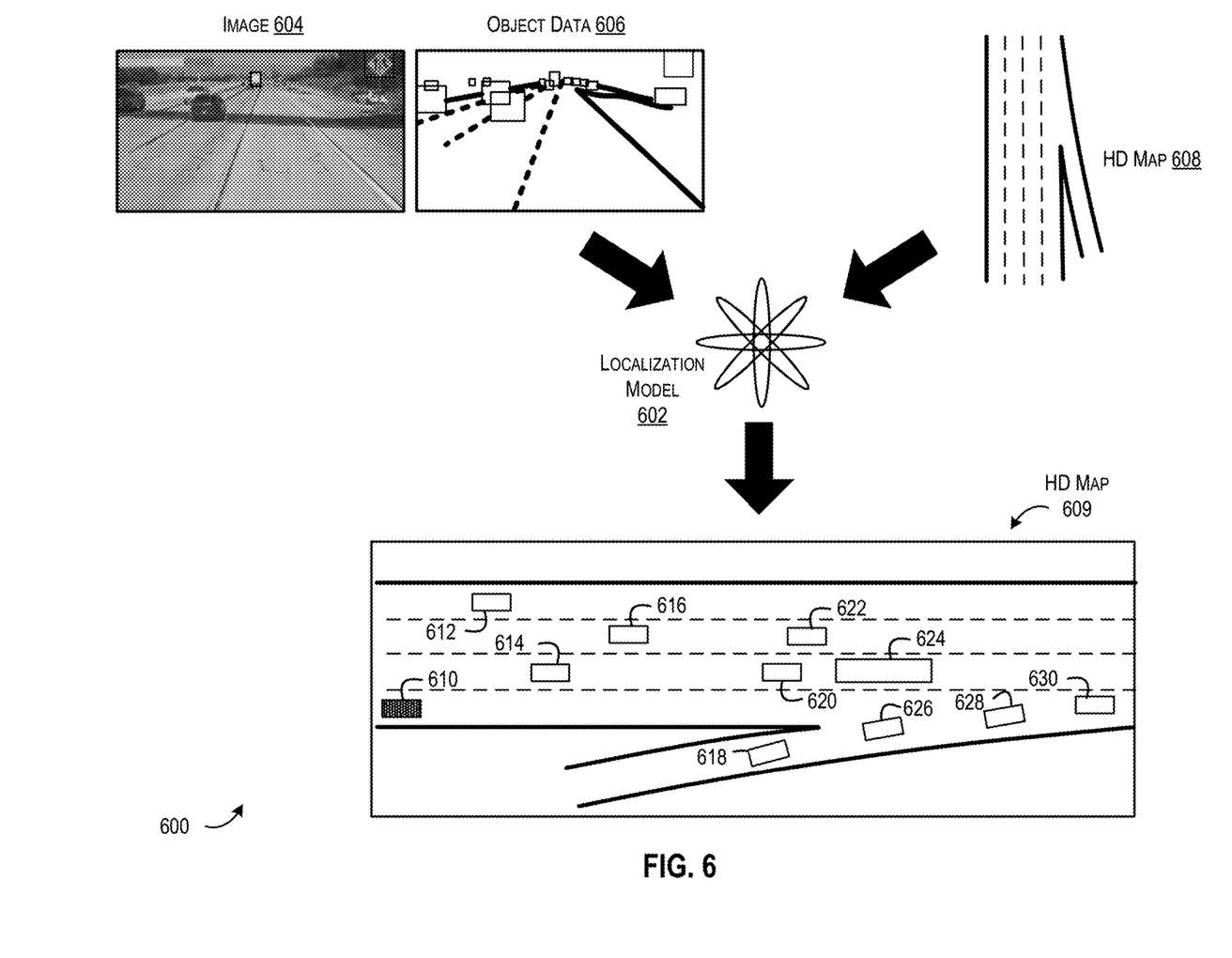
FIG. 6 illustrates an example method for utilizing a machine-learning model to perform localization operations, in accordance with at least one embodiment.

FIG. 6 illustrates an example method 600 for utilizing a machine-learning model (e.g., the localization model 602) to perform localization operations, in accordance with at least one embodiment. Localization model 602 may be an example of the localization model 502 of FIG. 5. In some embodiments an image (e.g., image 604) may be received and processed using any suitable object detection techniques, as described in connection with FIG. 2, to identify object data 606 (e.g., object detection data indicating locations and/or types of objects depicted within the image 604).

Object data 606 and HD map 608 (an HD map that currently does not include the objects depicted in image 604 and identified in object data 606) may be provided as input to the localization model 602. Localization model 602 may generate HD map 609 (or HD map data) including locations for the ego vehicle and the objects identified in object data 606 (e.g., objects 610-630, where object 610 is the ego vehicle), placed at locations within the HD map 609 that correspond to the locations identified based on the image 604. Objects 612-630 may be placed at locations within the HD map 609 in accordance with the locations that those objects were depicted in image 604 (as identified from object data 606). The localization model 602 may identify the location for the ego vehicle (e.g., object 610) based at least in part on estimating the camera's placement, view angle, and/or map elevation.

By utilizing these techniques, the localization model 602 may be utilized to generated the HD map 609 from the object data 606 and HD map 608 provided as input, thus avoiding projecting the HD map 608 to camera view and performing the matching procedure described in connection with FIG. 3 to match the camera view of the HD map 608 to the object data 606. Thus, the techniques described herein reduce the latency in localizing the location of the ego vehicle and objects identified in an image captured by the vehicle (e.g., by a camera of the vehicle). This enables the vehicle computer 950 to make quicker decisions regarding how best to react (if at all) to an object detected nearby.

Figure 7:
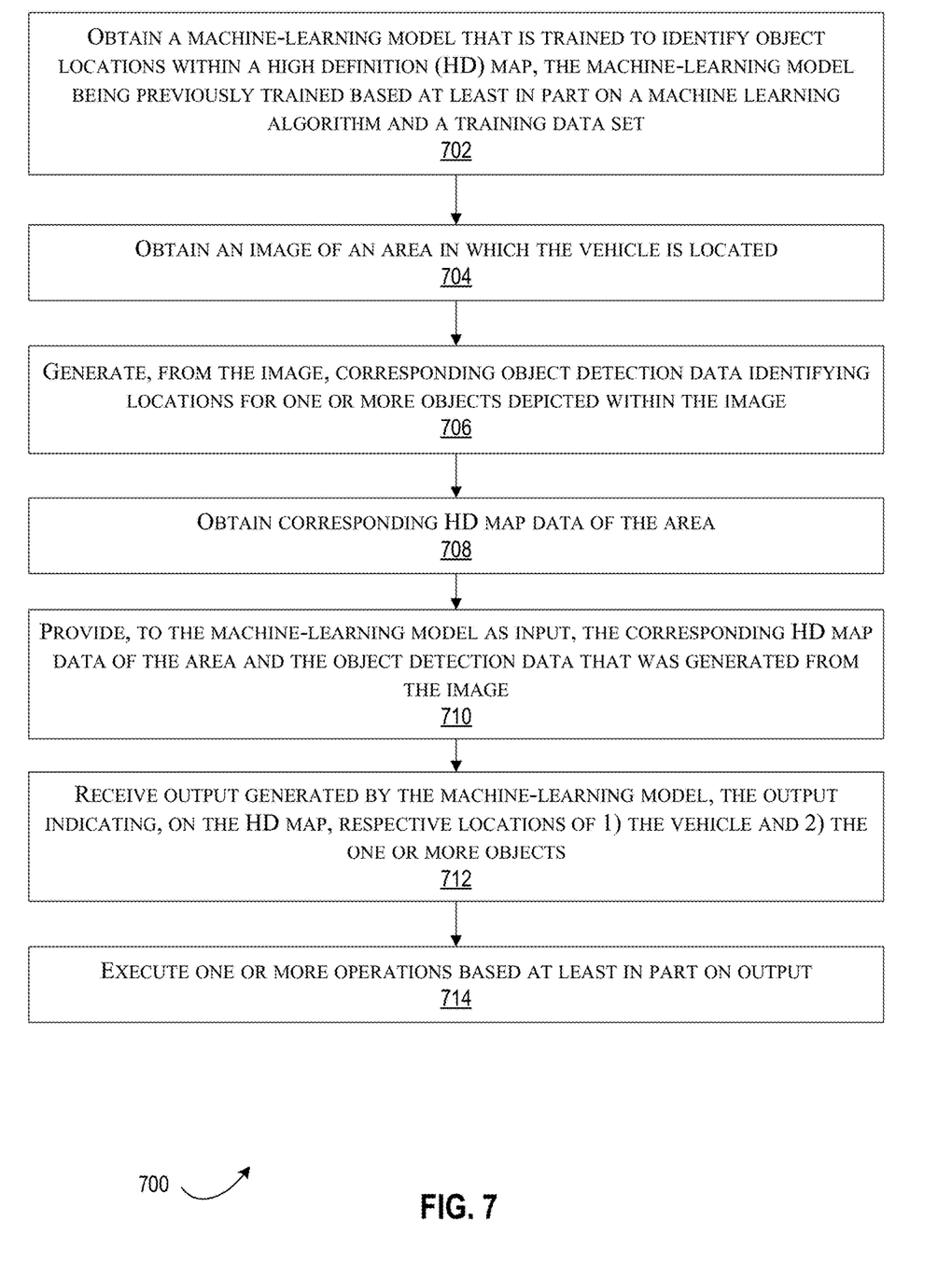
FIG. 7 is a flowchart of an example method, in accordance with at least one embodiment.

FIG. 7 is a flowchart of an example method 700, in accordance with at least one embodiment. In some implementations, one or more process blocks of FIG. 7 may be performed by a computing device (e.g., the vehicle computer 100 of FIG. 1, the vehicle computer 950 of FIG. 9, etc.). Although FIG. 7 shows example blocks of method 700, in some implementations, method 700 may include additional blocks, fewer blocks, different blocks, or differently arranged blocks than those depicted in FIG. 7. Additionally, or alternatively, two or more of the blocks of method 700 may be performed in parallel.

As shown in FIG. 7, the method 700 may begin at 702, where a processor (e.g., a processor of processor(s) 954 of FIG. 9) of a vehicle (e.g., vehicle 900 of FIG. 9) may obtain a machine-learning model. The machine-learning model (e.g., localization model 602 of FIG. 6) may be previously trained to identify object locations within a high definition (HD) map. In some embodiments, the machine-learning model may be previously trained based at least in part on a machine learning algorithm and a training data set comprising 1) HD map data corresponding to a respective HD map and identifying locations for one or more objects on the respective HD map and 2) object detection data corresponding to an image depicting the one or more objects. A method for training the machine-learning model is discussed in further detail above in connection with FIG. 5.

At 704, an image of an area in which the vehicle is located may be obtained by a camera of the vehicle. In some embodiments, sensor(s) 902 of FIG. 9 may include one or more cameras configured to capture images while the vehicle is in operation (e.g., running). The camera(s) may be positioned in any suitable manner (e.g., rear facing, forward facing, etc.) and may be configured to capture images according to a predefined protocol set.

At 706, corresponding object detection data identifying object locations for one or more objects depicted within the image may be generated (e.g., by the processor(s) 954). As described above in connection with FIG. 2, the image (e.g., image 200 of FIG. 2, image 604 of FIG. 6, an image captured by a camera of sensor(s) 902) may be processed based at least in part on any suitable object detection algorithm to identify object detection data (e.g., object detection data 202 of FIG. 2, object data 606 of FIG. 6, etc.). Object detection data may indicate locations corresponding to any suitable number of objects depicted within the image.

At 708, a corresponding HD map data of the area may be obtained. In some embodiments, the vehicle computer 950 may store any suitable number of HD maps. Each HD map may correspond to a particular geographical area. In some embodiments, the HD map corresponding to the area may be identified based at least in part on a location identified by one or more of the sensor(s) 902 (e.g., a GPS component) of the vehicle computer 950. This location can be identified as being associated with the HD map 608 of FIG. 6. In some embodiments, HD map 608 may correspond to a sub portion of a larger HD map stored in memory 952 of the vehicle computer 950.

At 710, the corresponding HD map data of the area and the corresponding object detection data generated from the image may be provided as input to the machine-learning model.

At 712, output generated by the machine-learning model may be received. In some embodiments, the output may indicate, on the HD map, respective locations of 1) the vehicle and 2) the one or more objects. HD map 609 of FIG. 6 may be an example of output provided by the machine-learning model.

At 714, one or more operations may be executed based at least in part on output. By way of example, the one or more operations executed may include predicting an object trajectory (e.g., a lane change of another vehicle identified as an object within the image) based on the locations of the objects as provided by the output generated at 712. In accordance with the predicted object trajectories, the vehicle computer 950 may be configured to instruct actuators 904 of vehicle 900 to perform one or more actions. In some embodiments, controlling, instructing, or activating the actuators 904 may cause the vehicle 900 to alter heading and/or speed. In other examples, the output generated by the machine-learning model (and/or object trajectories generated from that output) may cause the vehicle 900 to maintain heading and/or speed.

Embodiments provide various technical improvements over conventional systems that require a matching procedure to be utilized to first match detected lanes of an image to lanes of an HD map before object locations of objects in the image may be positioned on the HD map. Utilizing the localization model discussed herein, a vehicle computer (e.g., vehicle computer 950) can generate an HD map populated with objects at locations corresponding to those of the objects as depicted within an image captured by a camera of vehicle 900. This enables object detection, and more specifically, localization, to occur faster, utilizing fewer computations than conventional techniques allowed.

Figure 8:
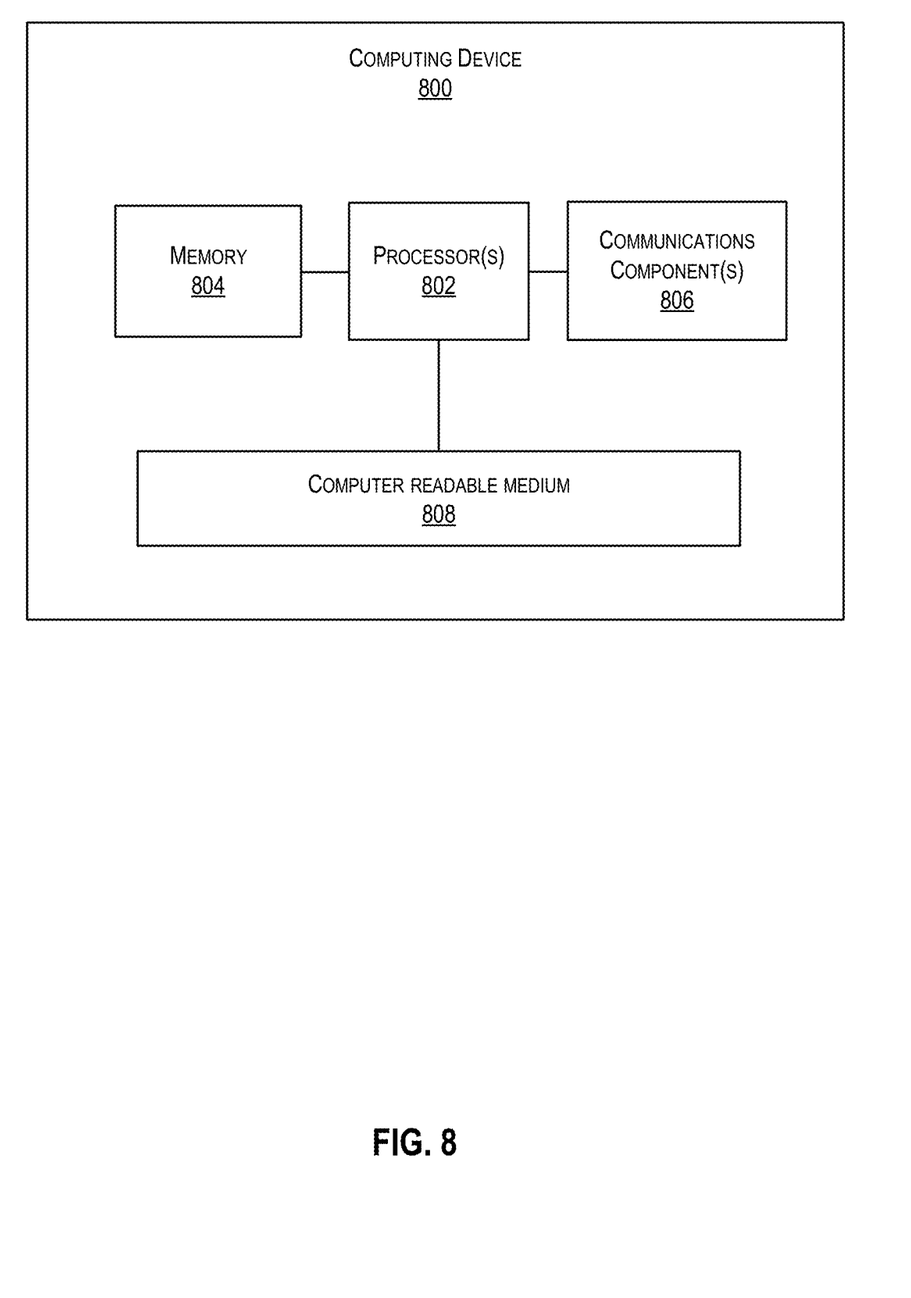
FIG. 8 illustrates components of an exemplary computing device, according to various embodiments.

FIG. 8 illustrates a block diagram of an exemplary computing device 800, according to various embodiments. The computing device 800 configured to receive inputs collected by a plurality of sources including one or more sensors (e.g., sensor(s) 902 of FIG. 9) coupled to a vehicle (e.g., the vehicle 900 of FIG. 9). These inputs may be received from the vehicle 900 or from any suitable computing device, storage, or system not depicted here (e.g., from a data base configured to store such inputs). According to various embodiments, computing device may include processor(s) 802, which may be coupled to a system memory 804, communication component(s) 806, computer readable medium 808, or any suitable combination thereof.

The memory 804 may be in the form of one or more memory devices (e.g., RAM, EEPROM, ROM chips), using any suitable mode of data storage. The memory 804 may store one or more software algorithm(s) (not shown). The software algorithm(s) may include, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s).

The communications component(s) 806 can be any suitable component(s) for communicating (e.g., sending/receiving data) via any suitable communications network(s) (not depicted) to and from the components of a vehicle computer (e.g., the vehicle computer 950 of FIG. 9) or any suitable computing device or system not depicted here. In some instances, the communication component(s) may include one or more of a wired network such as, an Ethernet backbone network, a controller area network (CAN) bus, a local interconnect network (LIN), a media-oriented system transport (MOST), a fiber-optic network, a digital subscription line ("DSL") network, a broadband network, and/or a flexray network. In other instances, the communication component(s) may also include a wireless network such as, for example, a Wi-Fi or wireless local area network ("WLAN"), a wireless wide area network ("WWAN"), and/or a cellular network.

A computer readable medium 808 may also be operatively coupled to the processor(s) 802 of the computing device. The computer readable medium 808 may comprise code that, when executed by the processor(s) 802, cause the computing device 800 to perform any suitable combination of the operations discussed in connection with FIGS. 1-7. By way of example, executing the code stored in computer readable medium 808 may cause the computing device to perform the operations of method 700 of FIG. 7.

FIG. 9 illustrates a block diagram of an exemplary vehicle (e.g., vehicle 900), according to various embodiments. The vehicle 900 may include a vehicle computer 950 that is configured to receive inputs from a plurality of sources including one or more sensors 902 coupled to the vehicle. The vehicle computer 950 is configured to generate outputs (e.g., control signals) for the one or more actuators 904 that control the vehicle 900. For example, the control signals, when executed by the actuators 904, may result in the vehicle 900 initiating a lane change maneuver. The actuators 904 may control a steering, speed or throttle of the vehicle.

According to various embodiments, the vehicle computer 950 may comprise processor(s) 954, which may be coupled to a system memory 952 and a communications component(s) 956.

The memory 952 may be in the form of one or more memory devices (e.g., RAM, EEPROM, ROM chips), using any suitable mode of data storage. The memory 952 may store one or more software algorithm(s) (not shown). The software algorithm(s) may include, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). In some embodiments, the memory 952 may store one or more models trained by the computing device 800 of FIG. 8 in accordance with the operations discussed above in connection with FIGS. 1-7.

The communications component(s) 956 can be any suitable component(s) for communicating (e.g., sending/receiving data) via any suitable communications network(s) (not depicted) to and from the components of a vehicle computer 950. In some instances, the communication component(s) 956 may include one or more of a wired network such as, an Ethernet backbone network, a controller area network (CAN) bus, a local interconnect network (LIN), a media-oriented system transport (MOST), a fiber-optic network, a digital subscription line ("DSL") network, a broadband network, and/or a flexray network. In other instances, the communication component(s) may also include a wireless network such as, for example, a Wi-Fi or wireless local area network ("WLAN"), a wireless wide area network ("WWAN"), and/or a cellular network.

The sensor(s) 902 may include one or more of a thermal imager camera, an infrared camera, a stereo camera, a time of flight camera, an red/green/blue (RGB) camera, a 2-D camera, a 3-D camera, a 360-degree camera, an imaging radar, a 3-D radar, a 4-D radar, a short-range radar, a medium-range radar, a long-range radar, a pulse-Doppler radar, a frequency-modulated continuous-wave (FMCW) radar, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, an active sonar, a passive sonar, etc. One of ordinary skill in the art will appreciate that sensor(s) 802 may include other types of sensors and the examples above are not meant to be exhaustive.

A computer readable medium 958 may also be operatively coupled to the processor(s) 954 of the vehicle computer 950. The computer readable medium 858 may comprise code, executable by the processor(s) 954, to perform the operations discussed in connection with FIG. 7.

Although vehicle 900 is described and illustrated as one particular configuration of vehicle, embodiments of the disclosure are suitable for use with a multiplicity of vehicles. In some instances, embodiments of the disclosure are particularly well suited for use with long haul or short haul vehicles, including but not limited to trucks, that carry a variety of cargo.

In some embodiments, the computing device 800 of FIG. 8 may operate, at least in part, at the vehicle 900. In some embodiments, vehicle 900 may be an example of the computing device 800 and may be configured to perform the operations described in connection with computing device 800.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

With reference to the appended figures, components that can include memory (e.g., memory 704 of FIG. 7, memory 852 of FIG. 8, etc.) can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally, or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter is not limited to the particular examples disclosed, but that such claimed subject matter may also include all aspects falling within the scope of appended claims, and equivalents thereof.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, controller, or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

What is claimed is:

1. A method comprising:
   obtaining, by a processor of a vehicle, a machine-learning model that is trained to identify object locations within a high definition (HD) map, the machine-learning model being previously trained based at least in part on a machine-learning algorithm and a training data set comprising 1) HD map data corresponding to a respective HD map, the HD map data identifying locations for one or more objects on the respective HD map and 2) object detection data corresponding to a respective image that has been generated from the respective HD map to depict the one or more objects;
   obtaining, by the processor from a camera of the vehicle, an image of an area in which the vehicle is located;
   generating, by the processor from the image, corresponding object detection data identifying locations for one or more objects depicted within the image;
   obtaining, by the processor, corresponding HD map data of an HD map of the area;
   providing, by the processor to the machine-learning model as input, the corresponding HD map data and the corresponding object detection data that was generated from the image of the area obtained from the camera of the vehicle;
   receiving, by the processor, output generated by the machine-learning model, the output identifying, on the HD map, 1) a first location of the vehicle and 2) one or more second locations within the HD map of the one or more objects depicted within the image obtained from the camera of the vehicle; and
   executing, by the processor, one or more operations based at least in part on the output.

2. The method of claim 1, wherein the one or more objects comprises a lane boundary.

3. The method of claim 2, wherein the lane boundary is associated with a solid line or a broken line.

4. The method of claim 1, further comprising:
   generating a synthetic training data set example for the training data set, the synthetic training data set example comprising particular HD map data indicating a corresponding location of an object on a particular HD map and object data identifying an object location within a particular image generated from the particular HD map and depicting the object; and training the machine-learning model using the machine-learning algorithm and the synthetic training data set example.

5. The method of claim 4, wherein generating the synthetic training data set example comprises:

obtaining first HD map data defining a first HD map;

obtaining second HD map data based at least in part on placing at least one object on the first HD map;

projecting the second HD map including the at least one object to a two-dimensional camera view image;

generating respective object detection data for the two-dimensional camera view image that was generated from projecting the second HD map including the at least one object, the respective object detection data identifying the locations of the at least one object within the two-dimensional camera view image; and storing, as the synthetic training data set example, the first HD map data, the second HD map data, and the respective object detection data.

6. The method of claim 5, wherein the at least one object is placed randomly on the first HD map.

7. The method of claim 1, wherein the machine-learning algorithm is an unsupervised machine-learning algorithm or a supervised machine-learning algorithm.

8. A vehicle computer of a vehicle, the vehicle computer comprising:

one or more processors; and one or more memories storing instructions that, when executed by the one or more processors, cause the one or more processors to:

obtain a machine-learning model that is trained to identify object locations within a high definition (HD) map, the machine-learning model being previously trained based at least in part on a machine learning algorithm and a training data set comprising 1) HD map data corresponding to a respective HD map, the HD map data identifying locations for one or more objects on the respective HD map and 2) object detection data corresponding to a respective image that has been generated from the respective HD map to depict the one or more objects;

obtain, from a camera of the vehicle, an image of an area in which the vehicle is located;

generate, from the image, corresponding object detection data identifying locations for one or more objects depicted within the image;

obtain corresponding HD map data of an HD map of the area;

provide, to the machine-learning model as input, the corresponding HD map data and the corresponding object detection data that was generated from the image of the area obtained from the camera of the vehicle;

receive output generated by the machine-learning model, the output generated by the machine-learning model, the output identifying, on the HD map, 1) a first location of the vehicle and 2) one or more second locations within the HD map of the one or more objects depicted within the image obtained from the camera of the vehicle; and execute one or more operations based at least in part on the output.

9. The vehicle computer of claim 8, wherein the vehicle is operating in an autonomous mode.

10. The vehicle computer of claim 8, wherein the one or more operations comprise controlling an actuator of the vehicle.

11. The vehicle computer of claim 8, wherein the one or more objects of the corresponding object detection data comprise a lane boundary and a physical object depicted in the image.

12. The vehicle computer of claim 8, wherein executing the instructions further causes the one or more processors to collect metrics associated with the one or more operations executed based on the output generated by the machine-learning model.

13. The vehicle computer of claim 12, wherein the metrics are used as part of a feedback procedure to refine the machine-learning model.

14. A non-transitory computer-readable medium storing instructions that, when executed by one or more processors of a vehicle computer of a vehicle, cause the one or more processors to:

obtain a machine-learning model that is trained to identify object locations within a high definition (HD) map, the machine-learning model being previously trained based at least in part on a machine learning algorithm and a training data set comprising 1) HD map data corresponding to a respective HD map, the HD map data identifying locations for one or more objects on the respective HD map and 2) object detection data corresponding to a respective image that has been generated from the respective HD map to depict the one or more objects;

obtain, from a camera of the vehicle, an image of an area in which the vehicle is located;

generate, from the image, corresponding object detection data identifying locations for one or more objects depicted within the image;

obtain corresponding HD map data of an HD map of the area;

provide, to the machine-learning model as input, the corresponding HD map data and the corresponding object detection data that was generated from the image of the area obtained from the camera of the vehicle;

receive output generated by the machine-learning model, the output generated by the machine-learning model, the output identifying, on the HD map, 1) a first location of the vehicle and 2) one or more second locations within the HD map of the one or more objects depicted within the image obtained from the camera of the vehicle; and execute one or more operations based at least in part on the output.

15. The non-transitory computer-readable medium of claim 14, wherein the HD map data comprises at least one of: a lane boundary, an intersection, a stop sign, a traffic light, a parking spot, a traffic speed, or a lane change restriction.

16. The non-transitory computer-readable medium of claim 14, wherein executing the instructions further cause the one or more processors to:

provide the image as input to an additional machine-learning model that is configured to generate the object detection data, wherein the object detection data identifies at least one lane boundary detected within the image.

17. The non-transitory computer-readable medium of claim 14, wherein the HD map data corresponding to the respective HD map of the training data set further identifies respective distances of the one or more objects from a camera of a corresponding vehicle that captured the respective image.

18. The non-transitory computer-readable medium of claim 14, wherein respective images of the training data set are projected from different HD map data instances of the training data set using different camera calibration settings.

19. The non-transitory computer-readable medium of claim 14, wherein the machine learning algorithm is a supervised machine learning algorithm.

20. The non-transitory computer-readable medium of claim 14, wherein executing the one or more operations comprises controlling an actuator of the vehicle, the vehicle being configured to operate autonomously.

* * * * *